United States Patent
Kazeto et al.

(10) Patent No.: US 11,939,442 B2
(45) Date of Patent: *Mar. 26, 2024

(54) WATER-SOLUBLE FILM, MANUFACTURING METHOD, AND PACKAGE

(71) Applicant: KURARAY CO., LTD., Okayama (JP)

(72) Inventors: Osamu Kazeto, Kurashiki (JP); Masahiro Takafuji, Saijo (JP)

(73) Assignee: KURARAY CO., LTD., Okayama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/036,640

(22) PCT Filed: Sep. 30, 2022

(86) PCT No.: PCT/JP2022/036860
§ 371 (c)(1),
(2) Date: May 11, 2023

(87) PCT Pub. No.: WO2023/054721
PCT Pub. Date: Apr. 6, 2023

(65) Prior Publication Data
US 2023/0323047 A1    Oct. 12, 2023

(30) Foreign Application Priority Data

Oct. 1, 2021 (JP) ................... 2021-163140

(51) Int. Cl.
*C11D 17/00* (2006.01)
*C08F 16/06* (2006.01)
*C08J 5/18* (2006.01)
*C08K 5/053* (2006.01)
*C08L 29/04* (2006.01)

(52) U.S. Cl.
CPC ............... *C08J 5/18* (2013.01); *C08K 5/053* (2013.01); *C08F 16/06* (2013.01); *C08J 2300/14* (2013.01); *C08J 2329/04* (2013.01); *C11D 17/00* (2013.01)

(58) Field of Classification Search
None
See application file for complete search history.

(56) References Cited

U.S. PATENT DOCUMENTS

| | | |
|---|---|---|
| 2016/0369072 A1 | 12/2016 | Yamaguchi |
| 2017/0247154 A1 | 8/2017 | Ieda et al. |
| 2017/0253708 A1 | 9/2017 | Ieda et al. |
| 2018/0245028 A1 | 8/2018 | Ookubo et al. |
| 2019/0194442 A1 | 6/2019 | Ieda et al. |
| 2020/0063076 A1 | 2/2020 | Hiura |
| 2021/0324156 A1 | 10/2021 | Okamoto et al. |
| 2021/0324159 A1 | 10/2021 | Okamoto et al. |
| 2021/0324160 A1 | 10/2021 | Okamoto et al. |
| 2021/0324163 A1 | 10/2021 | Okamoto et al. |
| 2023/0039669 A1 | 2/2023 | Shigemasa et al. |

FOREIGN PATENT DOCUMENTS

| | | |
|---|---|---|
| CN | 105940050 A | 9/2016 |
| CN | 107922645 A | 4/2018 |
| CN | 109438958 A | 3/2019 |
| CN | 110603285 A | 12/2019 |
| JP | 2017-52897 A | 3/2017 |
| JP | 2017-78166 A | 4/2017 |
| WO | 2016/043009 A1 | 3/2016 |
| WO | 2017/043505 A1 | 3/2017 |
| WO | 2019/124262 A1 | 6/2019 |
| WO | 2019/212723 A1 | 11/2019 |
| WO | 2019/213347 A1 | 11/2019 |
| WO | 2020/138437 A1 | 7/2020 |
| WO | 2020/138440 A1 | 7/2020 |
| WO | 2020/138441 A1 | 7/2020 |
| WO | 2020/138444 A1 | 7/2020 |
| WO | WO-2020138444 A1 * | 7/2020 ............. B65D 65/46 |
| WO | 2021/145021 A1 | 7/2021 |

OTHER PUBLICATIONS

International Search Report issued in corresponding International Patent Application No. PCT/JP2022/036860 dated Nov. 29, 2022.
Written Opinion issued in corresponding International Patent Application No. PCT/JP2022/036860 dated Nov. 29, 2022.
Extended European Search Report issued in corresponding International Patent Application No. PCT/JP2022/036860 dated Oct. 4, 2023.
Office Action dated Sep. 19, 2023 for counterpart Chinese Patent Application No. 202280007176.2.

* cited by examiner

*Primary Examiner* — Richard A Huhn
(74) *Attorney, Agent, or Firm* — Morgan, Lewis & Bockius LLP

(57) ABSTRACT

The present disclosure relates to a water-soluble film comprising polyvinyl alcohol having a polymerization degree of 100 to 3,000 and a polyhydric alcohol plasticizer.

20 Claims, 1 Drawing Sheet

WATER-SOLUBLE FILM, MANUFACTURING METHOD, AND PACKAGE

TECHNICAL FIELD

The invention relates to a water-soluble film containing polyvinyl alcohol that is suitably used for packaging various chemical agents and the like, and a manufacturing method for the water-soluble film and a packaging material using the water-soluble film.

BACKGROUND ART

A water-soluble film has been used in a wide range of applications, including packaging of various chemical agents such as a liquid detergent and an agricultural chemical, and seed tapes containing seeds, by utilizing its excellent solubility in water. Polyvinyl alcohol (hereinafter, may be referred to as PVA) has been mainly used in the water-soluble film used in such applications. It is known that water solubility of the water-soluble film can be enhanced by blending various additives such as a plasticizer in the water-soluble film containing polyvinyl alcohol, or by using modified polyvinyl alcohol into which a carboxyl group is introduced as a raw material of the water-soluble film.

In recent years, among these applications, applications in which a chemical agent such as a household laundry detergent is packaged with a water-soluble film to form a package have been widely spread. In general, when the package is manufactured, the chemical agent is packaged in a state where end sides of the water-soluble film are heat-sealed with each other and tension is applied to the water-soluble film, such that it is often the case that wrinkles generated in the package are suppressed and excellent appearance is shown. However, when the package under such tension is stored for a long period of time, there is a problem that the tension of the package is lost over time and the appearance becomes poor.

To solve such a problem, Patent Literature 1 proposes a water-soluble film containing a PVA-based resin and a plasticizer, in which an area change rate when the water-soluble film is immersed in a predetermined solution exhibits a specific value. According to the water-soluble film, it is possible to obtain a water-soluble film capable of forming an excellent package that does not impair water solubility of the water-soluble film and does not impair tension of the water-soluble film over time even in a state where a liquid such as a liquid detergent is packaged to form a package.

CITATION LIST

Patent Literature

Patent Literature 1: WO 2017/043505 A

SUMMARY OF INVENTION

Technical Problem

However, in recent years, it has been found that even in a case of a package using the water-soluble film described in Patent Literature 1, when the package is stored for a long period of time in a container or the like so as to be transported by sea, a seal strength of a heat-sealed part may be reduced and the heat-sealed part may be broken. Such a problem is more remarkable in a package obtained by heat-sealing a water-soluble film in a state where tension is applied to the water-soluble film in order to exhibit excellent appearance of the package, and is more remarkable due to thinning of the water-soluble film associated with environmental problems in recent years.

A main component of the chemical agent packaged in the water-soluble film is a surfactant, and in particular, there are many substances having a relatively low molecular weight and high polarity. In addition, PVA contained in the water-soluble film is a hydrophilic polymer, and has high affinity with the substance having high polarity. Therefore, it is presumed that when a package using the water-soluble film is stored for a long period of time, these substances penetrate into the water-soluble film and reach the heat-sealed part, which adversely affects the seal strength.

An object of the present invention is to provide a water-soluble film that hardly causes a reduction in seal strength during long-term storage when a chemical agent such as a laundry detergent is packaged while maintaining excellent water solubility, a method for manufacturing the water-soluble film, and a package in which a chemical agent is packaged using the water-soluble film.

Solution to Problem

As a result of intensive studies, the present inventors have found that the above problem can be solved by setting a contact angle when a model detergent is added dropwise to a water-soluble film, a complete dissolution time when the water-soluble film is immersed in deionized water after being immersed in the model detergent, and a swelling degree when the water-soluble film is immersed in the model detergent, to specific ranges. Then, the present inventors have further conducted studies based on such findings, thereby completing the present invention.

That is, the present invention relates to:

[1] A water-soluble film comprising polyvinyl alcohol having a polymerization degree of 100 to 3,000 and a polyhydric alcohol plasticizer in an amount of 1 to 50 parts by mass with respect to 100 parts by mass of the polyvinyl alcohol, wherein when the water-soluble film is immersed in a model detergent containing 8.6 mass % of monoethanolamine, 23.8 mass % of dodecylbenzenesulfonic acid, 9.5 mass % of propylene glycol, 23.8 mass % of a lauryl alcohol ethoxylate-7 ethylene oxide adduct, 19.1 mass % of oleic acid, 9.5 mass % of diethylene glycol, and 5.7 mass % of water in an environment of 23° C. and 50% RH for 24 hours, and then deionized water is added dropwise to a surface of the film, a contact angle at 6 seconds after the dropwise addition is 20° or more, when the water-soluble film is immersed in the model detergent in an environment of 23° C. and 50% RH for 24 hours and then the water-soluble film is immersed in deionized water at 5° C., a complete dissolution time is within 100 seconds, and a swelling degree of the water-soluble film when the water-soluble film is immersed in the model detergent in an environment of 23° C. and 50% RH for 1 hour is 30 to 50%.

Furthermore, the present invention relates to:

[2] The water-soluble film according to [1], wherein when the water-soluble film is immersed in the model detergent in an environment of 23° C. and 50% RH for 24 hours, and then deionized water is added dropwise to the surface of the film, the contact angle at 6 seconds after the dropwise addition is 35° or less.

[3] The water-soluble film according to [1] or [2], wherein a seal strength of the water-soluble film is 2.0 to 10.0

N/15 mm when the water-soluble film is heat-sealed at 165° C. after the water-soluble film is immersed in the model detergent in an environment of 23° C. and 50% RH for 24 hours.

[4] The water-soluble film according to any one of [1] to [3], wherein the polyvinyl alcohol is carboxylic acid modified or sulfonic acid modified polyvinyl alcohol, and is polyvinyl alcohol having a saponification degree of 85 mol % or more.

[5] The water-soluble film according to any one of [1] to [4], wherein a thickness of the water-soluble film is 5 to 80 μm.

[6] A method for manufacturing the water-soluble film according to any one of [1] to [5] by casting a film forming stock solution containing polyvinyl alcohol into a film shape onto a support from a die through a die lip and drying the film forming stock solution, wherein a draft ratio obtained by dividing a linear velocity of the support on which the film forming stock solution is cast by a linear velocity of the film forming stock solution at the die lip is 2 to 60, and a reduction rate of volatile components in the film forming stock solution on the support is 0.5 to 7 mass %/sec.

[7] The method for manufacturing the water-soluble film according to [6], wherein a draw ratio obtained by dividing a winding speed of the film after drying by the linear velocity of the support on which the film forming stock solution is cast is 0.95 to 1.8.

[8] The method for manufacturing the water-soluble film according to [6] or [7], wherein the method includes a step of heat-treating the water-soluble film at 80 to 300° C.

[9] A package wherein the water-soluble film according to any one of [1] to [5] contains a chemical agent.

[10] The package according to [9], wherein the chemical agent is an agricultural chemical, a detergent, or a disinfectant.

[11] The package according to [9] or [10], wherein the chemical agent is a liquid form.

Advantageous Effects of Invention

According to the present invention, a water-soluble film that hardly causes a reduction in seal strength during long-term storage when a chemical agent such as a laundry detergent is packaged while maintaining excellent water solubility, a method for manufacturing the water-soluble film, and a package in which a chemical agent is packaged using the water-soluble film are provided.

DESCRIPTION OF EMBODIMENTS

Figure 1A:
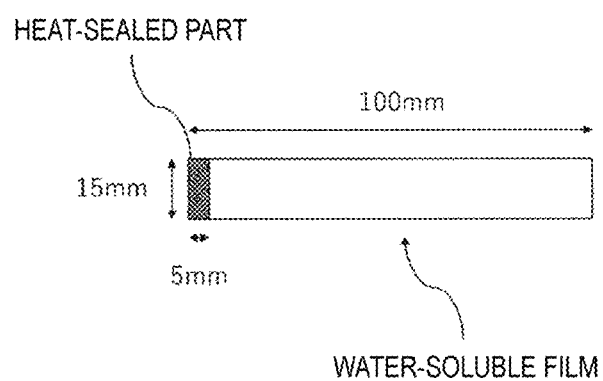
FIG. 1 is a view for illustrating a method for measuring a seal strength when a water-soluble film is immersed in a model detergent in an environment of 23° C. and 50% RH for 24 hours and then the water-soluble film is the heat-sealed at 165° C.

Hereinafter, the present invention will be specifically described.

<Model Detergent>

In the present invention, a model detergent simulating a household laundry detergent refers to a detergent having the following composition.

| | |
|---|---|
| Monoethanolamine | 8.6 mass % |
| Dodecylbenzenesulfonic acid | 23.8 mass % |
| Propylene glycol | 9.5 mass % |
| Lauryl alcohol ethoxylate-7 ethylene oxide adduct | 23.8 mass % |
| Oleic acid | 19.1 mass % |
| Diethylene glycol | 9.5 mass % |
| Water | 5.7 mass % |

<Contact Angle of Water-Soluble Film>

In the present invention, when a water-soluble film is immersed in the model detergent in an environment of 23° C. and 50% RH for 24 hours and then deionized water is added dropwise to a surface of the film, a contact angle at 6 seconds after the dropwise addition (hereinafter, may be referred to as a contact angle) is measured by the following methods <1> to <4>.

<1> A water-soluble film is stored in a room at 23° C. and 50% RH for 16 hours or longer for humidity control.

<2> The humidity-controlled water-soluble film is immersed in the model detergent whose mass is 100 times or more the mass of the film in an environment of 23° C. and 50% RH for 24 hours.

<3> After the water-soluble film is taken out from the model detergent and the model detergent attached to the surface of the water-soluble film is wiped off with filter paper, when droplets of deionized water are added dropwise to the surface of the water-soluble film, a change in contact angle over time is continuously recorded under the following devices and conditions, and a contact angle at 6 seconds after the dropwise addition is determined from the graph.

Device: Mobile Surface Analyzer manufactured by KRUSS GmbH (Kruss Item #MSA) Syringe Dosing System Use of (Kruss Item #DS3910)

Measurement environment: 23° C., 35% RH

Measurement procedure:

Test piece size: 2 inches×3 inches

Amount of droplets of deionized water: 1 μL

Measurement up to 10 seconds over time (0.06 second intervals) after setting a contact time between the droplets and the film to 0 seconds Use of Young-Laplace method for fitting the droplet contact angle <4> The measurement is repeated three times, and an average value thereof is taken as a contact angle after immersion in the detergent.

Note that the reason why the data obtained 6 seconds after the dropwise addition is selected is that the data near 6 seconds after the dropwise addition has the smallest variation, and an accurate measurement value can be obtained.

In the present invention, the contact angle of the water-soluble film is 20° or more. When the contact angle of the water-soluble film is less than 20°, a seal strength for long-term storage when a chemical agent such as a laundry detergent is packaged (hereinafter, referred to as a seal strength) may be insufficient. A lower limit of the contact angle of the water-soluble film is preferably 22° or more, more preferably 23° or more, and still more preferably 24° or more. On the other hand, an upper limit of the contact angle of the water-soluble film is preferably 35° or less, more preferably 33° or less, still more preferably 31° or less, and particularly preferably 29° or less. When the contact angle of the water-soluble film is equal to or less than the above upper limit, the seal strength tends to be sufficient.

It is presumed that the contact angle of the water-soluble film strongly depends on the affinity between the water-soluble film and the model detergent on the surface of the water-soluble film. Therefore, the contact angle of the water-soluble film can be controlled by adjusting a composition of the water-soluble film (for example, a saponification degree and a modification degree of PVA, a type and a content of the plasticizer, and additives) and film forming conditions (a draft ratio, drying conditions, a draw ratio, and the like), which affect the hydrophilicity of the surface of the water-soluble film.

<Swelling Degree of Water-Soluble Film>

In the present invention, a swelling degree of the water-soluble film when the water-soluble film is immersed in the model detergent in an environment of 23° C. and 50% RH for 1 hour (hereinafter, may be referred to as a swelling degree) is measured by the following methods <1> to <4>.

<1> A test piece having a size of 20 cm in width direction×20 cm in length direction is cut out from the water-soluble film.

<2> The cut test piece is stored in a room at 23° C. and 50% RH for 16 hours or longer for humidity control.

<3> A mass of the humidity-controlled test piece is measured as "a mass of the test piece before immersion in the model detergent", and the test piece is immersed in the model detergent whose mass is 100 times or more the mass of the test piece in an environment of 23° C. and 50% RH for 1 hour.

<4> After the test piece is taken out from the model detergent and the model detergent attached to the surface of the water-soluble film is wiped off with filter paper, a mass of the test piece is measured in an environment of 23° C. and 50% RH as "a mass of the test piece after immersion in the model detergent", and a swelling degree of the water-soluble film is determined by the following equation.

Swelling degree of water-soluble film (%)={(Mass of test piece after immersion in model detergent−Mass of test piece before immersion in model detergent)/Mass of test piece before immersion in model detergent}×100

In the present invention, the swelling degree of the water-soluble film is 30 to 50%. When the swelling degree of the water-soluble film exceeds 50%, the water-soluble film may absorb the model detergent, resulting in an insufficient seal strength. An upper limit of the swelling degree of the water-soluble film is preferably 45% or less, more preferably 43% or less, and still more preferably 41% or less. On the other hand, when the swelling degree of the water-soluble film is less than 30%, it is considered that the amount of PVA crystals in the water-soluble film is large, which is presumed to result in insufficient softening of the water-soluble film during heat sealing and an insufficient seal strength. A lower limit of the swelling degree of the water-soluble film is preferably 32% or more, more preferably 34% or more, and still more preferably 36% or more.

It is presumed that the swelling degree of the water-soluble film is strongly affected by a crystal structure of PVA such as a PVA crystal or PVA amorphous structure in the water-soluble film. Therefore, the swelling degree of the water-soluble film can be controlled by adjusting the composition of the water-soluble film (for example, the saponification degree and the modification degree of PVA, and the type and the content of the plasticizer) and the film forming conditions (the draft ratio, the drying conditions, the draw ratio, and the like).

<Complete Dissolution Time of Water-Soluble Film>

In the present invention, a complete dissolution time when the water-soluble film is immersed in deionized water at 5° C. after being immersed in the model detergent in an environment of 23° C. and 50% RH for 24 hours (hereinafter, may be referred to as a complete dissolution time) is measured by the following methods <1> to <6>.

<1> The water-soluble film is placed in a thermo-hygrostat adjusted to 20° C. and 65% RH for 16 hours or longer for humidity control.

<2> After a rectangular sample having a size of 40 mm in length×35 mm in width is cut out from the humidity-controlled water-soluble film, the rectangular sample is immersed in the model detergent whose mass is 100 times or more the mass of the film in an environment of 23° C. and 50% RH for 24 hours.

<3> 300 mL of deionized water is placed in a 500 mL beaker, and a water temperature is adjusted to 5±0.3° C. while stirring with a magnetic stirrer equipped with a bar having a length of 3 cm at a rotation speed of 280 rpm.

<4> After the film sample is taken out from the model detergent and the model detergent attached to the surface is quickly wiped off with filter paper, the film sample is interposed and fixed between two plastic plates having a size of 50 mm×50 mm with a rectangular opened window (hole) having a size of 35 mm in length×23 mm in width so that a length direction of the film sample is parallel to a length direction of the window and the sample is positioned at substantially the center in a width direction of the window.

<5> The sample fixed to the plastic plates in <4> above is immersed in deionized water in the beaker while being careful not to be in contact with the bar of the magnetic stirrer.

<6> A time until the sample immersed in deionized water completely disappears from immersion in deionized water is measured.

Note that, in the present invention, "the sample completely disappears" means that a visually recognizable undissolved residue of the water-soluble film becomes invisible.

In the present invention, the complete dissolution time of the water-soluble film is within 100 seconds. When the complete dissolution time exceeds 100 seconds, it may be difficult to use for packaging various chemical agents such as a liquid detergent and an agricultural chemical. An upper limit of the complete dissolution time is preferably within 90 seconds, more preferably within 75 seconds, and still more preferably within 60 seconds. On the other hand, a lower limit of the complete dissolution time of the water-soluble film is not particularly limited, but when the complete dissolution time is too short, the water-soluble film absorbs moisture in the air, blocking occurs between the water-soluble films, and the strength of the water-soluble film tends to be easily reduced. The lower limit of the complete dissolution time is preferably 5 seconds or longer, more preferably 10 seconds or longer, still more preferably 15 seconds or longer, and particularly preferably 20 seconds or longer.

It is presumed that the complete dissolution time of the water-soluble film is strongly affected by the affinity of PVA with water and the crystal structure of PVA such as a PVA crystal or PVA amorphous structure in the water-soluble film. Therefore, the complete dissolution time of the water-soluble film can be controlled by adjusting the composition of the water-soluble film (for example, the saponification degree and the modification degree of PVA, and the type and the content of the plasticizer) and the film forming conditions (the draft ratio, the drying conditions, the draw ratio, and the like).

<Seal Strength at 165° C. of Water-Soluble Film>

Figure 1B:
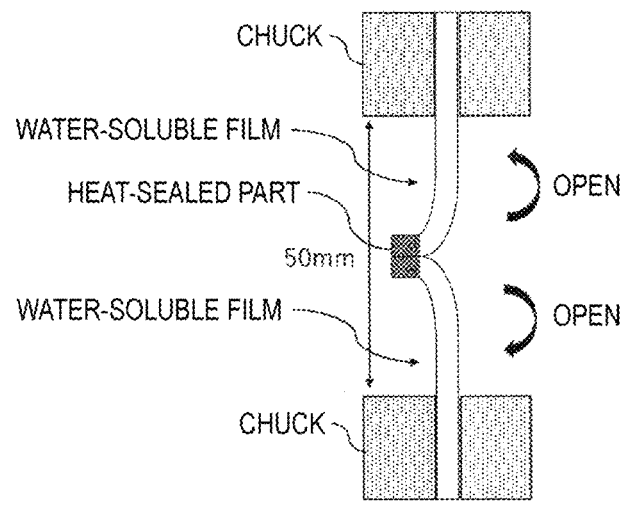

In the present invention, a seal strength of the water-soluble film when the water-soluble film is heat-sealed at 165° C. after the water-soluble film is immersed in the model detergent in an environment of 23° C. and 50% RH for 24 hours (hereinafter, may be referred to as a seal strength at 165° C.) is measured by the following methods <1> to <6>. FIG. 1 is a view for illustrating a method for measuring a seal strength at 165° C. FIG. 1A is a view of the water-soluble film as viewed in a thickness direction thereof, and FIG. 1B is a view of the water-soluble film as viewed in a side surface direction when the water-soluble film is set in a chuck in <5> below.

<1> As illustrated in FIG. 1A, 10 or more test pieces having a size of 100 mm in width direction×15 mm in length direction are cut out from the water-soluble film.

<2> The cut test piece is stored in a room at 23° C. and 50% RH for 16 hours or longer for humidity control.

<3> The humidity-controlled test pieces are immersed in the model detergent whose mass is 100 times or more the mass of the test pieces in an environment of 23° C. and 50% RH for 1 hour while the test pieces are not overlapped with each other.

<4> After the test pieces are taken out from the model detergent and the model detergent attached to the surface of the water-soluble film is wiped off with filter paper, as illustrated in FIG. 1B, two test pieces are overlapped with each other, and one of short sides having a length of 15 mm is heat-sealed with a width of 5 mm at a set heat seal pressure of 1.2 MPa in an environment of 23° C. and 50% RH using a heat gradient tester HG-100-2 manufactured by Toyo Seiki Seisaku-sho, Ltd. Five or more sets of heat-sealed test pieces are prepared.

<5> A short side on a non-heat-sealed side of one set of heat-sealed test pieces is peeled off, and as illustrated in FIG. 1B, each of the test pieces is set in a chuck of a tabletop precision universal testing machine AGS-H manufactured by Shimadzu Corporation, and the maximum test force when pulled under the following conditions is measured.
Atmosphere: 23° C., 50% RH
Chuck interval: 50 mm
Tensile speed: 300 mm/min <6> The measurement is performed on five or more sets of heat-sealed test pieces, and an average value of the obtained maximum test forces is taken as a seal strength at 165° C. [N/15 mm].

In the present invention, the seal strength at 165° C. of the water-soluble film is preferably 2.0 to 10.0 N/15 mm. When the seal strength at 165° C. is 2.0 N/15 mm or more, breakage hardly occurs in the sealed part of the package in which the chemical agent is packaged during transportation or the like. The seal strength at 165° C. is more preferably 2.5 N/15 mm or more, and still more preferably 3.0 N/15 mm or more. On the other hand, when the seal strength at 165° C. is 10.0 N/15 mm or less, the strength of the water-soluble film is prevented from being reduced, and the water-soluble film other than the heat-sealed part is less likely to be broken. The seal strength at 165° C. is more preferably 9.5 N/15 mm or less, and still more preferably 8.5 N/15 mm or less.

<Thickness of Water-Soluble Film>

An upper limit of the thickness of the water-soluble film of the present invention is preferably 80 μm or less, more preferably 70 μm or less, still more preferably 60 μm or less, and particularly preferably 50 μm or less. On the other hand, a lower limit of the thickness of the water-soluble film is preferably 5 μm or more, more preferably 10 μm or more, still more preferably 15 μm or more, and particularly preferably 20 μm or more. When the thickness of the water-soluble film is equal to or more than the above lower limit, perforation is less likely to occur when the water-soluble film is used as a package. Note that the thickness of the water-soluble film can be determined as an average value of thicknesses measured at 10 arbitrary locations (for example, 10 arbitrary locations on a straight line drawn in the length direction of the water-soluble film).

<PVA>

The water-soluble film of the present invention contains PVA. As PVA, PVA produced by saponifying a vinyl ester polymer obtained by polymerizing a vinyl ester monomer can be used. Examples of the vinyl ester monomer include vinyl formate, vinyl acetate, vinyl propionate, vinyl valerate, vinyl laurate, vinyl stearate, vinyl benzoate, vinyl pivalate, and vinyl versatate, and among them, vinyl acetate is preferable.

The vinyl ester polymer is preferably obtained using only one or two or more vinyl ester monomers as a monomer, and more preferably obtained using only one vinyl ester monomer as a monomer. However, the vinyl ester polymer may be a copolymer of one or two or more vinyl ester monomers and other monomers copolymerizable therewith.

Examples of the other monomers copolymerizable with such a vinyl ester monomer include ethylene; an olefin having 3 to 30 carbon atoms such as propylene, 1-butene, or isobutene; an acrylic acid or a salt thereof; an acrylic acid ester such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, or octadecyl acrylate; a methacrylic acid or a salt thereof; a methacrylic acid ester such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, or octadecyl methacrylate; acrylamide, or an acrylamide derivative such as N-methylacrylamide, N-ethylacrylamide, N,N-dimethylacrylamide, diacetoneacrylamide, acrylamidopropanesulfonic acid or a salt thereof, acrylamidopropyldimethylamine or a salt thereof, or N-methylolacrylamide or a derivative thereof; methacrylamide, or a methacrylamide derivative such as N-methylmethacrylamide, N-ethylmethacrylamide, methacrylamidopropanesulfonic acid or a salt thereof, methacrylamidopropyldimethylamine or a salt thereof, or N-methylolmethacrylamide or a derivative thereof; N-vinylamide such as N-vinylformamide, N-vinylacetamide, or N-vinylpyrrolidone; a vinyl ether such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, or stearyl vinyl ether; a vinyl cyanide such as acrylonitrile or methacrylonitrile; a vinyl halide such as vinyl chloride, vinylidene chloride, vinyl fluoride, or vinylidene fluoride; an allyl compound such as allyl acetate or allyl chloride; maleic acid or a salt, ester, or anhydride thereof; itaconic acid or a salt, ester, or anhydride thereof; a vinylsilyl compound such as vinyltrimethoxysilane; and isopropenyl acetate. The vinyl ester polymer can have a structural unit derived from one or two or more of these other monomers.

Among the other monomers copolymerizable with the vinyl ester monomer, a monomer that produces bulky functional groups in the polymer side chain after polymerization and saponification is not preferable because the seal strength of the obtained water-soluble film is easily reduced. From this viewpoint, olefins having a small number of carbon atoms such as ethylene and propylene, a carboxylic acid-based monomer such as an acrylic acid or a methacrylic acid, or a sulfonic acid-based monomer is preferable. Among them, the carboxylic acid-based monomer or the sulfonic acid-based monomer is more preferable because the contact angle, the swelling degree, and the complete dissolution time of the obtained water-soluble film are easily balanced.

PVA contained in the water-soluble film of the present invention is preferably carboxylic acid modified PVA obtained by saponifying a carboxylic acid-vinyl acetate copolymer obtained by copolymerizing vinyl acetate and a carboxylic acid monomer. An upper limit of a modification degree of the carboxylic acid modified PVA is preferably 10 mol % or less, more preferably 8 mol % or less, and still more preferably 6 mol % or less. On the other hand, a lower limit of the modification degree of the carboxylic acid modified PVA is preferably 0.5 mol % or more, more preferably 1 mol % or more, and still more preferably 2 mol % or more.

PVA contained in the water-soluble film of the present invention is also preferably sulfonic acid modified PVA obtained by saponifying a sulfonic acid-vinyl acetate copolymer obtained by copolymerizing vinyl acetate and a sulfonic acid monomer. An upper limit of a modification degree of the sulfonic acid modified PVA is preferably 8 mol % or less, more preferably 6 mol % or less, and still more preferably 4 mol % or less. On the other hand, a lower limit of the modification degree of the sulfonic acid modified PVA is preferably 0.3 mol % or more, more preferably 0.7 mol % or more, and still more preferably 1 mol % or more.

An upper limit of a proportion of structural units derived from the other monomers in the vinyl ester polymer is preferably 15 mol % or less, and more preferably 5% mol % or less, based on the number of moles of all the structural units constituting the vinyl ester polymer, from the viewpoint of water solubility of the water-soluble film and suppression of perforation.

In the present invention, a polymerization degree of PVA contained in the water-soluble film is 100 to 3,000. When the polymerization degree of PVA is less than 100, the strength of the water-soluble film may be insufficient. The polymerization degree of PVA is preferably 200 or more, more preferably 300 or more, and still more preferably 500 or more. On the other hand, when the polymerization degree of PVA exceeds 3,000, it may be difficult to ensure the productivity of PVA and the water-soluble film and the water solubility of the water-soluble film. The polymerization degree of PVA is preferably 2,500 or less, more preferably 2,000 or less, and still more preferably 1,500 or less. Here, the polymerization degree means an average polymerization degree (Po) measured according to the description of JIS K6726-1994, and is determined from an intrinsic viscosity [η] (deciliter/g) measured in water at 30° C. after re-saponification and purification of PVA by the following equation.

$$Po=([\eta]\times10^4/8.29)^{(1/0.62)}$$

In the present invention, a saponification degree of PVA contained in the water-soluble film is preferably 80 to 99.5 mol %. Here, the saponification degree of PVA refers to a proportion (mol %) of the number of moles of the vinyl alcohol unit to the total number of moles of the structural unit (typically, a vinyl ester monomer unit) that can be converted into a vinyl alcohol unit by saponification and the vinyl alcohol unit that are included in PVA. The saponification degree of PVA can be measured according to the description of JIS K6726-1994.

Among these kinds of PVA, in cases of unmodified PVA and hydrophobic ethylene modified PVA, the number of acetic acid groups that disturb the crystal structure of PVA in the water-soluble water is smaller as a saponification degree is higher, and thus the detergent is less likely to penetrate and the influence thereof is reduced, but when the saponification degree is too high, the water solubility of the water-soluble film may be reduced. From such a viewpoint, an upper limit of the saponification degree of each of the unmodified PVA and ethylene modified PVA is preferably 99.5 mol % or less, more preferably 97 mol % or less, still more preferably 95 mol % or less, and particularly preferably 93 mol % or less. On the other hand, a lower limit of the saponification degree of each of the unmodified PVA and hydrophobic ethylene modified PVA is preferably 80 mol % or more, more preferably 83 mol % or more, still more preferably 85 mol % or more, and particularly preferably 87 mol % or more. When the saponification degree of each of the unmodified PVA and hydrophobic ethylene modified PVA is equal to or more than the above lower limit, the strength of the water-soluble film tends to be sufficient. Note that the unmodified PVA is PVA obtained by saponifying a vinyl acetate homopolymer obtained by homopolymerization of vinyl acetate. In addition, the ethylene modified PVA is PVA obtained by saponifying an ethylene-vinyl acetate copolymer obtained by copolymerization of vinyl acetate and ethylene.

Among these kinds of PVA, in the cases of the carboxylic acid modified PVA and sulfonic acid modified PVA, since a carboxyl group and a sulfone group to be introduced are hydrophilic groups, the water solubility of the water-soluble film is preferable even when the saponification degree is high. An upper limit of a saponification degree of each of the carboxylic acid modified PVA and sulfonic acid modified PVA is preferably 99 mol % or less, more preferably 97 mol % or less, and particularly preferably 96 mol % or less. On the other hand, a lower limit of the saponification degree of each of the carboxylic acid modified PVA and sulfonic acid modified PVA is preferably 85 mol % or more, more preferably 90 mol % or more, and still more preferably 93 mol % or more.

In the water-soluble film in the present invention, one kind of PVA may be used alone as PVA, or two or more kinds of PVA having different polymerization degrees, saponification degrees, modification degrees, or the like may be blended and used.

In the present invention, an upper limit of a content of PVA in the water-soluble film is not particularly limited, but a lower limit of the content of PVA is preferably 50 mass % or more, more preferably 80 mass % or more, and still more preferably 85 mass % or more.

<Polyhydric Alcohol Plasticizer>

In the present invention, the water-soluble film contains a polyhydric alcohol plasticizer in an amount of 1 to 50 parts by mass with respect to 100 parts by mass of PVA. When the content of the polyhydric alcohol plasticizer exceeds 50 parts by mass, the contact angle and the swelling degree of the obtained water-soluble film tend to be too large. An upper limit of the content of the polyhydric alcohol plasticizer is preferably 40 parts by mass or less, and more preferably 30 parts by mass or less. On the other hand, when the content of the polyhydric alcohol plasticizer is less than 1 part by mass, the contact angle of the obtained water-soluble film tends to be too small and the swelling degree tends to be too large. In addition, the seal strength at 165° C. of the obtained water-soluble film tends to be too low. A lower limit of the content of the polyhydric alcohol plasticizer is preferably 3 parts by mass or more and more preferably 5 parts by mass or more.

In the present invention, examples of the polyhydric alcohol plasticizer contained in the water-soluble film include ethylene glycol, glycerin, diglycerin, propylene glycol, diethylene glycol, triethylene glycol, tetraethylene glycol, trimethylolpropane, and sorbitol. These polyhydric alcohol plasticizers may be used alone or in a combination of two or more thereof. Among these polyhydric alcohol plasticizers, ethylene glycol or glycerin is preferable, and glycerin is more preferable, from the viewpoint of particularly easily adjusting the contact angle of the water-soluble film. Note that, when the polyhydric alcohol plasticizer is contained in a film forming stock solution of the water-soluble film, the polyhydric alcohol plasticizer can be contained in the obtained water-soluble film. In addition, a proportion of the content of the polyhydric alcohol plasticizer in the water-soluble film is substantially equal to a proportion of the amount of polyhydric alcohol plasticizer added in the film forming stock solution of the water-soluble film.

The type and amount of the polyhydric alcohol plasticizer contained in the film forming stock solution of the water-soluble film affect the crystal structure of PVA in the water-soluble film. When the amount of the polyhydric alcohol plasticizer having high affinity with PVA is appropriately increased, the mobility of the PVA molecules is increased when the PVA film obtained by casting a film forming stock solution described below onto a support is dried, such that a crystallization rate of PVA is increased at the time of manufacturing a water-soluble film, and PVA crystals in the obtained water-soluble film are easily formed in the obtained water-soluble film. On the other hand, when the amount of the polyhydric alcohol plasticizer is excessively increased, an interaction between the PVA polyhydric alcohol plasticizers is strengthened, and an interaction between the PVA molecules is reduced, such that PVA crystals are less likely to be formed in the obtained water-soluble film. Here, it is presumed that the swelling degree of the water-soluble film depends on the amount of PVA crystals in the waster-soluble film. In addition, the surface of the water-soluble film, which serves as an interface with the hydrophobic air, also tends to be hydrophobic, but this tendency increases as the crystallization rate of PVA during manufacturing of the water-soluble film decreases. Therefore, the contact angle and the swelling degree of the water-soluble film can be adjusted by adjusting the type and amount of the polyhydric alcohol plasticizer.

<Starch/Water-Soluble Polymer>

In order to impart mechanical strength to the water-soluble film or maintain handleability of the water-soluble film, the water-soluble film of the present invention may contain a water-soluble polymer other than starch and/or PVA.

Examples of the starch include natural starches such as corn starch, potato starch, sweet potato starch, wheat starch, rice starch, tapioca starch, and sago starch; and modified starches that are etherified, esterified, oxidized, and the like, and modified starches are more preferable.

An upper limit of a content of the starch in the water-soluble film is preferably 15 parts by mass or less, and more preferably 10 parts by mass or less, with respect to 100 parts by mass of PVA. When the content of the starch is equal to or less than the above upper limit, it is easy to prevent process passability during manufacturing of the water-soluble film from deteriorating.

Examples of the water-soluble polymer other than PVA include dextrin, gelatin, glue, casein, shellac, gum arabic, polyacrylic acid amide, sodium polyacrylate, polyvinyl methyl ether, a copolymer of methyl vinyl ether and maleic anhydride, a copolymer of vinyl acetate and itaconic acid, polyvinylpyrrolidone, cellulose, acetyl cellulose, acetyl butyl cellulose, carboxymethyl cellulose, methyl cellulose, ethyl cellulose, hydroxyethyl cellulose, and sodium alginate.

An upper limit of a content of the water-soluble polymer other than PVA in the water-soluble film is preferably 15 parts by mass or less, and more preferably 10 parts by mass or less, with respect to 100 parts by mass of PVA. When the content of the water-soluble polymer is equal to or less than the above upper limit, it is easy to prevent the water solubility of the water-soluble film from being impaired.

<Surfactant>

In the present invention, the water-soluble film preferably contains a surfactant from the viewpoint of the handleability thereof and the improvement of the peelability from a film forming apparatus when the water-soluble film is manufactured. The type of surfactant is not particularly limited, and examples thereof include an anionic surfactant and a nonionic surfactant.

Examples of the anionic surfactant include a carboxylic acid type surfactant such as potassium laurate; a sulfuric acid ester type surfactant such as octyl sulfate; and a sulfonic acid type surfactant such as dodecylbenzenesulfonate.

Examples of the nonionic surfactant include an alkyl ether type surfactant such as polyoxyethylene lauryl ether or polyoxyethylene oleyl ether; an alkylphenyl ether type surfactant such as polyoxyethylene octylphenyl ether; an alkyl ester type surfactant such as polyoxyethylene laurate; an alkylamine type surfactant such as polyoxyethylene lauryl amino ether; an alkylamide type surfactant such as polyoxyethylene lauric acid amide; a polypropylene glycol ether type surfactant such as polyoxyethylene polyoxypropylene ether; an alkanolamide type surfactant such as lauric acid diethanolamide or oleic acid diethanolamide; and an allyl phenyl ether type surfactant such as polyoxyalkylene allyl phenyl ether.

These surfactants may be used alone or in a combination of two or more thereof. Among these surfactants, a nonionic surfactant is preferable, an alkanolamide type surfactant is more preferable, and dialkanolamide (for example, diethanolamide or the like) of an aliphatic carboxylic acid (for example, a saturated or unsaturated aliphatic carboxylic acid having 8 to 30 carbon atoms or the like) is still more preferable, from the viewpoint of further reducing film surface abnormality generated during manufacturing of the water-soluble film.

An upper limit of a content of the surfactant in the water-soluble film is preferably 10 parts by mass or less, more preferably 1 part by mass or less, still more preferably 0.5 parts by mass or less, and particularly preferably 0.3 parts by mass or less, with respect to 100 parts by mass of PVA. When the content of the surfactant is equal to or less than the above upper limit, it is easy to prevent the surfactant from bleeding out to the surface of the water-soluble film and the appearance of the water-soluble film from deteriorating due to aggregation of the surfactant. On the other hand, a lower limit of the content of the surfactant is preferably 0.01 parts by mass or more, more preferably 0.02 parts by mass or more, and still more preferably 0.05 parts by mass or more, with respect to 100 parts by mass of PVA. When the content of the surfactant is equal to or more than the above lower limit, it is easy to improve the peelability from the film forming apparatus when the water-soluble film is manufactured. In addition, occurrence of blocking between the water-soluble films can be easily prevented.

<Filler>

The water-soluble film of the present invention may contain a filler. By containing the filler, the mechanical strength and handleability of the water-soluble film can be improved, and since the model detergent cannot permeate the filler, a path length required for permeation in the film becomes long, such that improvement of a barrier performance can be expected.

Examples of the filler include carbon black, metal powder, silica, alumina, calcium carbonate, titanium dioxide, and clay minerals such as talc, mica, and bentonite.

An upper limit of a content of the filler in the water-soluble film is preferably 40 parts by mass or less, more preferably 20 parts by mass or less, and still more preferably 10 parts by mass or less, with respect to 100 parts by mass of PVA. When the content of the filler is equal to or less than the above upper limit, it is easy to prevent the seal strength at 165° C. of the water-soluble film from being reduced and the appearance of transparency or the like from deteriorating. A lower limit of the content of the filler in the water-soluble film is preferably 0.1 parts by mass or more, more preferably 0.5 parts by mass or more, and still more preferably 1 part by mass or more, with respect to 100 parts by mass of PVA.

<Other Components>

The water-soluble film of the present invention may contain components such as moisture, an antioxidant, a UV absorber, a lubricant, a cross-linking agent, a colorant, a preservative, an antifungal agent, and other polymer compounds, in addition to a plasticizer, starch, a water-soluble polymer other than PVA, and a surfactant, as long as the effect of the present invention is not impaired. A proportion of the total mass of PVA, the plasticizer, the starch, the water-soluble polymer other than PVA, and the surfactant to the total mass of the water-soluble film of the present invention is preferably within a range of 60 to 100 mass %, more preferably within a range of 80 to 100 mass %, and still more preferably within a range of 90 to 100 mass %.

<Method for Manufacturing Water-Soluble Film>

In the present invention, a method for manufacturing a water-soluble film is not particularly limited, and a method for manufacturing a film by a casting film forming method, a wet film forming method (discharging into a poor solvent), a dry wet film forming method, a gel film forming method (a method for obtaining a water-soluble film by cooling and gelling a film forming stock solution and then extracting a solvent), and a combination thereof, which use homogenized film forming stock solution obtained by adding a solvent, an additive, and the like to PVA, or a method for manufacturing a film by any method such as a melt extrusion film forming method in which a film is manufactured by obtaining a film forming stock solution using an extruder or the like and extruding the film forming stock solution from a T-die or the like or an inflation molding method can be used. Among them, a casting film forming method or a melt extrusion film forming method is preferable because a homogeneous water-soluble film can be obtained with high productivity.

Hereinafter, the casting film forming method or the melt extrusion film forming method for a water-soluble film will be described.

In a case where the water-soluble film is manufactured by the casting film forming method or the melt extrusion film forming method, the film forming stock solution is heated to remove the solvent, such that the film forming stock solution is solidified and formed into a film. The solidified film is peeled off from the support, dried by a drying roll, a drying furnace, or the like as necessary, further heat-treated as necessary, and wound, such that a roll-shaped long water-soluble film can be obtained.

An upper limit of a volatile fraction in the film forming stock solution (a concentration of volatile components such as a solvent removed by volatilization or evaporation during film manufacturing or the like) is preferably 90 mass % or less and more preferably 80 mass % or less. When the volatile fraction in the film forming stock solution is equal to or less than the above upper limit, it is easy to prevent a viscosity of the film forming stock solution from decreasing and the uniformity of the thickness of the obtained water-soluble film from being impaired. On the other hand, a lower limit of the volatile fraction in the film forming stock solution is preferably 50 mass % or more and more preferably 55 mass % or more. When the volatile fraction in the film forming stock solution is equal to or more than the above lower limit, it is easy to prevent the viscosity of the film forming stock solution from increasing and the manufacturing of the water-soluble film from being difficult.

Here, the "volatile fraction in the film forming stock solution" in the present specification refers to a volatile fraction determined by the following equation.

$$\text{Volatile fraction in film forming stock solution(mass \%)} = \{(Wa-Wb)/Wa\} \times 100$$

(In the equation, Wa represents a mass (g) of the film forming stock solution, and Wb represents a mass (g) when the film forming stock solution of Wa (g) is dried in an electric heat dryer at 105° C. for 16 hours.)

A method for adjusting the film forming stock solution is not particularly limited, and examples thereof include a method for dissolving PVA, and additives such as a plasticizer and a surfactant in a dissolution tank or the like, and a method for melt-kneading PVA in a water-containing state together with a plasticizer, a surfactant, and the like using a single-screw or twin-screw extruder. Among them, a method for dissolving in a dissolution tank or the like or a method using a twin-screw extruder is preferable.

The adjusted film forming stock solution is transferred to a T-die or the like through a pipe or the like, and discharged into a film shape onto a support through a die lip.

In the method for manufacturing a water-soluble film of the present invention, a film forming stock solution containing PVA is cast into a film shape onto a support from a die through a die lip and dried, and a draft ratio obtained by dividing a linear velocity of the support onto which the film forming stock solution is cast by a linear velocity of the film forming stock solution at the die lip is preferably 2 to 60. An upper limit of the draft ratio is preferably 50 or less, more preferably 40 or less, and particularly preferably 30 or less. When the draft ratio is equal to or less than the above upper limit, it is easy to prevent the contact angle of the obtained water-soluble film from being too large, the swelling degree from being too small, and the seal strength at 165° C. from being reduced. In addition, when the draft ratio is equal to or less than the above upper limit, it is easy to prevent the thickness of the obtained water-soluble film from becoming uneven and the complete dissolution time from becoming long due to a reduction in water solubility. On the other hand, a lower limit of the draft ratio is preferably 5 or more, more preferably 8 or more, and particularly preferably 10 or more. When the draft ratio is equal to or more than the above lower limit, it is easy to prevent the contact angle of the obtained water-soluble film from being too small, the swelling degree from being too large, and the seal strength at 165° C. from being reduced. Note that the linear velocity of the film forming stock solution at the die lip can be determined by dividing a volume flow rate of the film forming stock solution by an area of a die lip opening (width of die lip×lip opening).

The reason why the draft ratio affects the contact angle, the swelling degree, and the complete dissolution time of the water-soluble film is not clear, but it is considered that when the draft ratio is increased, the PVA film formed by casting the film forming stock solution into a film shape onto the support is pulled between the die lip and the support, such that an entanglement of PVA molecular chains in the PVA film is released, and thus crystallization of PVA during drying easily proceeds and PVA crystals are easily formed.

In the method for manufacturing a water-soluble film of the present invention, a reduction rate of the volatile components in the film forming stock solution on the support is preferably 0.5 to 7 mass %/sec. An upper limit of the reduction rate of the volatile components in the film forming stock solution is preferably less than 6 mass %/sec and more preferably less than 5 mass %/sec. When the reduction rate of the volatile components in the film forming stock solution is equal to or less than the above upper limit, it is easy to prevent the contact angle of the obtained water-soluble film from being too small, the swelling degree from being too large, and the seal strength at 165° C. from being reduced. On the other hand, a lower limit of the reduction rate of the volatile components in the film forming stock solution is preferably 1 mass %/sec or more and more preferably 2 mass %/sec or more. When the reduction rate of the volatile components in the film forming stock solution is equal to or more than the above lower limit, it is easy to prevent the contact angle of the obtained water-soluble film from being too large, the swelling degree from being too small, and the seal strength at 165° C. from being reduced.

The reduction rate of the volatile components in the film forming stock solution on the support can be calculated by the following equation.

Reduction rate of volatile components in film forming stock solution on support=(Volatile fraction in film forming stock solution−Volatile fraction in film immediately after peeling off from support)/Contact time between film and support The volatile fraction in the film can be calculated from a mass change before and after the film is dried in the electric heat dryer at 105° C. for 16 hours, similarly to the volatile fraction in the film forming stock solution.

A surface temperature of the support on which the film forming stock solution is cast is preferably 50 to 110° C. An upper limit of the surface temperature of the support is preferably 100° C. or lower and more preferably 95° C. or lower. When the surface temperature of the support is equal to or less than the above upper limit, it is easy to prevent the contact angle of the obtained water-soluble film from being too small, the swelling degree from being too large, and the seal strength at 165° C. from being reduced. In addition, when the PVA film formed by casting the film forming stock solution into a film shape onto the support is dried, it is easy to prevent the occurrence of film surface abnormality such as foaming. On the other hand, a lower limit of the surface temperature of the support is more preferably 60° C. or higher and still more preferably 65° C. or higher. When the surface temperature of the support is equal to or more than the above lower limit, it is easy to prevent the crystallization of PVA from proceeding too much by slowly drying the PVA film. As a result, it is easy to prevent the contact angle of the obtained water-soluble film from being too large, the swelling degree from being too small, and the seal strength at 165° C. from being reduced. In addition, it is easy to prevent the water solubility of the obtained water-soluble film from being reduced and the complete dissolution time from becoming long.

At the same time that the PVA film is heated and dried on the support, a drying speed may be adjusted by uniformly blowing hot air over the entire region of the non-contact surface side of the PVA film. An upper limit of a temperature of the hot air is preferably 105° C. or lower and more preferably 100° C. or lower. When the temperature of the hot air is equal to or less than the above upper limit, it is easy to prevent the contact angle of the obtained water-soluble film from being too small, the swelling degree from being too large, and the seal strength at 165° C. from being reduced. On the other hand, a lower limit of the temperature of the hot air is preferably 75° C. or higher and more preferably 85° C. or higher. When the temperature of the hot air is equal to or more than the above lower limit, it is easy to prevent the contact angle of the obtained water-soluble film from being too large, the swelling degree from being too small, and the seal strength at 165° C. from being reduced. In addition, it is easy to prevent the water solubility of the obtained water-soluble film from being reduced and the complete dissolution time from becoming long. In addition, an upper limit of a velocity of the hot air is preferably 10 m/sec or less and more preferably 7 m/sec or less. A lower limit of the velocity of the hot air is preferably 1 m/sec or more and more preferably 3 m/sec or more.

The PVA film formed by casting the film forming stock solution into a film shape onto the support is dried on the support preferably at a volatile fraction of up to 5 to 50 mass %, and then the dried PVA film is peeled off, and further dried as necessary. A drying method is not particularly limited, and examples thereof include a method of bringing the PVA film into contact with the drying furnace or the drying roll. In the case of drying with a plurality of drying rolls, it is preferable to alternately bring one surface and the other surface of the PVA film into contact with the drying rolls in order to make physical properties of both of the surfaces of the obtained water-soluble film uniform. The number of drying rolls is preferably 3 or more, more preferably 4 or more, and still more preferably 5 or more. The number of drying rolls is preferably 30 or less.

An upper limit of a temperature of each of the drying furnace and the drying roll is preferably 110° C. or lower, more preferably 100° C. or lower, still more preferably 90° C. or lower, and further still more preferably 85° C. or lower. When the temperature of each of the drying furnace and the drying roll is equal to or less than the above upper limit, it is easy to prevent the water solubility of the water-soluble film from being impaired. On the other hand, a lower limit of the temperature of each of the drying furnace and the drying roll is preferably 40° C. or higher, more preferably 45° C. or higher, and still more preferably 50° C. or higher. When the temperature of each of the drying furnace and the drying roll is equal to or more than the above lower limit, it is easy to prevent the contact angle of the obtained water-soluble film from being too large, the swelling degree from being too small, and the seal strength at 165° C. from being reduced.

In the method for manufacturing a water-soluble film of the present invention, an upper limit of a draw ratio obtained by dividing a winding speed of the film after drying by a linear velocity of the support on which the film forming stock solution is cast is preferably 1.80 or less, more preferably 1.75 or less, and still more preferably 1.70 or less. When the draw ratio is equal to or less than the above upper limit, it is easy to prevent the contact angle of the obtained water-soluble film from being too large, the swelling degree from being too small, and the seal strength at 165° C. from being reduced. On the other hand, a lower limit of the draw ratio is preferably 0.95 or more, more preferably 1.00 or more, and still more preferably 1.05 or more. When the draw ratio is equal to or more than the above lower limit, it is easy to prevent the contact angle of the obtained water-soluble film from being too small, the swelling degree from being too large, and the seal strength at 165° C. from being reduced.

The reason why the draw ratio affects the contact angle, the swelling degree, and the seal strength at 165° C. of the water-soluble film is not clear, but it can be said that the water-soluble film is stretched substantially in a film flow direction (MD direction) together with the volume shrinkage due to volatilization of the solvent since tension is always applied in the MD direction in a process of drying the water-soluble film. When the water-soluble film is stretched while containing a large amount of moisture, orientation crystallization of the PVA molecules is likely to occur, and the PVA crystals are likely to be formed.

The method for manufacturing a water-soluble film of the present invention preferably includes a step of heat-treating the water-soluble film at 80 to 300° C. By performing the heat treatment, the contact angle, the swelling degree, and the complete dissolution time of the water-soluble film can be adjusted. An upper limit of the temperature of the heat treatment is preferably 280° C. or lower, more preferably 260° C. or lower, and particularly preferably 240° C. or lower. When the temperature of the heat treatment is equal to or less than the above upper limit, it is easy to prevent the contact angle of the obtained water-soluble film from being too large, the swelling degree from being too small, and the seal strength at 165° C. from being reduced. On the other hand, a lower limit of the temperature of the heat treatment is preferably 90° C. or higher, more preferably 100° C. or higher, and particularly preferably 105° C. or higher. When the temperature of the heat treatment is equal to or more than the above lower limit, it is easy to prevent the contact angle of the obtained water-soluble film from being too small, the swelling degree from being too large, and the seal strength at 165° C. from being reduced.

The water-soluble film manufactured as described above is further subjected to a humidity control treatment, embossing processing, cutting of both ends (ears) of the film, and the like as necessary, and then the film is wound into a roll shape on a cylindrical core.

An upper limit of a volatile fraction in the water-soluble film finally obtained by a series of treatments is preferably 5 mass % or less and more preferably 4 mass % or less. A lower limit of the volatile fraction in the water-soluble film is preferably 1 mass % or more and more preferably 2 mass % or more.

<Application>

The water-soluble film of the present invention can be suitably used for various applications of the water-soluble film. Examples of such a water-soluble film include a film for packaging a chemical agent, a base film for liquid pressure transfer, a base film for embroidering, a release film for forming artificial marble, a film for packaging seeds, and a film for a waste storage bag. Among them, the water-soluble film of the present invention is preferably used as a film for packaging a chemical agent because the effect of the present invention is more remarkably exhibited.

In a case where the water-soluble film of the present invention is used as a film for packaging a chemical agent, examples of the type of chemical agent include an agricultural chemical, a detergent (including a bleaching agent), and a disinfectant. Physical properties of the chemical agent are not particularly limited, and may be acidic, neutral, or alkaline. In addition, a boron-containing compound is contained in the chemical agent. The form of the chemical agent may be any of a powder form, a lump form, a gel form, and a liquid form. The packaging form is not particularly limited, but a unit packaging form in which a chemical agent is packaged (preferably sealed packaging) unit by unit is preferable. Used the film of the present invention as a film for packaging a chemical agent to package a chemical agent, the package of the present invention is obtained.

EXAMPLES

Hereinafter, the present invention will be specifically described with reference to Examples and the like, but the present invention is not limited by the following Examples.

(1) Contact Angle of Water-Soluble Film

When a water-soluble film was immersed in a model detergent in an environment of 23° C. and 50% RH for 24 hours and then deionized water was added dropwise to a surface of the film, a contact angle at 6 seconds after the dropwise addition was determined by the method described above.

(2) Swelling Degree of Water-Soluble Film

A swelling degree of the water-soluble film when the water-soluble film was immersed in the model detergent in an environment of 23° C. and 50% RH for 1 hour was measured by the method described above.

(3) Complete Dissolution Time of Water-Soluble Film

A complete dissolution time of the water-soluble film when the water-soluble film was immersed in deionized water at 5° C. after the water-soluble film was immersed in the model detergent in an environment of 23° C. and 50% RH for 24 hours was measured by the method described above.

(4) Seal Strength at 165° C. of Water-Soluble Film

A seal strength of the water-soluble film when the water-soluble film was heat-sealed at 165° C. after the water-soluble film was immersed in the model detergent in an environment of 23° C. and 50% RH for 24 hours was measured by the method described above.

(5) Transportation Test

A transportation test of a package in which the model detergent was packaged with the water-soluble film was conducted by the following methods <1> to <7>.

<1> Two test pieces having a size of 7 cm×7 cm were cut out from the water-soluble film.

<2> The two cut test pieces were stored in a room at 23° C. and 50% RH for 16 hours or longer for humidity control.

<3> The humidity-controlled two test pieces were immersed in the model detergent in an environment of 23° C. and 50% RH for 16 hours.

<4> The two test pieces taken out from the model detergent were overlapped with each other after wiping off the model detergent attached to the surface with filter paper, and three sides of the test pieces were heat-sealed with a seal width of 1 cm, thereby preparing a pouch with one open side.

<5> The model detergent with 20 cm³ was placed in the pouch, the seal width was adjusted so that the film was stretched without wrinkles on a surface of the pouch, and the remaining one side was heat-sealed, thereby preparing a model detergent package.

<6> 100 packages described above were prepared, and the packages were packed in a 45 L polyethylene bag and then placed in a cardboard box (320×335×325 cm). A gap between the polyethylene bag and the cardboard box was filled with a cushioning material. Then, a transportation test, in which the cardboard box containing the packages was loaded on a truck and transported 10 times between Okayama Prefecture and Tokyo, was conducted.

<7> The packages after transport were visually observed, and the number of broken packages was examined.

Example 1

100 parts by mass of carboxylic acid modified PVA modified with 4 mol % monomethyl maleate (MMM) (saponification degree: 96 mol %, polymerization degree: 1,200) obtained by saponifying polyvinyl acetate modified with 4 mol % MMM, 25 parts by mass of glycerin as a polyhydric alcohol plasticizer, 0.2 parts by mass of lauric acid diethanolamide as a surfactant, and water were put into a twin-screw extruder and then a film forming stock solution having a volatile fraction of 60 mass % was prepared. The film forming stock solution was discharged onto a metal roll (support) having a surface temperature of 90° C. from a T-die through a die lip at a draft ratio of 11, and the film forming stock solution was cast and then dried by bowing hot air at 100° C. at a speed of 5 m/sec to the entire non-contact surface with the support. A reduction rate of volatile components in the film forming stock solution on the support under the above conditions was 2.3 mass %/sec. Next, the PVA film was peeled off from the support and then dried from a second drying roll to a final drying roll so that one surface and the other surface of the PVA film were alternately brought into contact with each drying roll. All the surface temperatures of the second drying roll to the final drying roll were 80° C. Next, one surface and the other surface of the PVA film were alternately brought into contact with two heat treatment rolls having a surface temperature of 110° C., a heat treatment was performed, and then the PVA film was wound around a vinyl chloride roll core. A draw ratio from the support to the winding was 1.4. As a result, a water-soluble film (thickness: 40 μm, length: 1,200 m, width: 1 m) was obtained.

A contact angle, a swelling degree, a complete dissolution time, and a seal strength at 165° C. of the water-soluble film were measured using the obtained water-soluble film. Furthermore, a transportation test was conducted on a package containing the model detergent packaged with the water-soluble film. The results are shown in Table 1.

Examples 2 and 3 and Comparative Example 1

Water-soluble films were obtained in the same manner as that of Example 1, except that carboxylic acid modified PVA modified with 4 mol % MMM (saponification degree: 96 mol %, polymerization degree: 1,200) was changed to sulfonic acid modified PVA modified with 2 mol % 2-acrylamido-2-methylpropyl sulfonic acid (AMPS) (saponification degree: 99 mol %, polymerization degree: 1,200) in Example 2, carboxylic acid modified PVA modified with 4 mol % MMM (saponification degree: 96 mol %, polymerization degree: 1,200) was changed to unmodified PVA (saponification degree: 88 mol %, polymerization degree: 1,200) in Example 3, and carboxylic acid modified PVA modified with 4 mol % MMM (saponification degree: 96 mol %, polymerization degree: 1,200) was changed to unmodified PVA (saponification degree: 99 mol %, polymerization degree: 1,200) in Comparative Example 1. A contact angle, a swelling degree, a complete dissolution time, and a seal strength at 165° C. of the water-soluble film were measured using the obtained water-soluble film. Furthermore, a transportation test was conducted on a package containing the model detergent packaged with the water-soluble film. The results are shown in Table 1.

Example 4

A water-soluble film was obtained in the same manner as that of Example 3, except that the draft ratio between the T-die and the support was changed to 31, the surface temperature of the support was changed to 80° C., the temperature of the hot air blown to the entire non-contact surface with the support was changed to 90° C., the surface temperature of the heat treatment roll was changed to 180° C., and the draw ratio from the support to the winding was changed to 1.8. A reduction rate of volatile components in the film forming stock solution on the support under the above conditions was 5.9 mass %/sec. A contact angle, a swelling degree, a complete dissolution time, and a seal strength at 165° C. of the water-soluble film were measured using the obtained water-soluble film. Furthermore, a transportation test was conducted on a package containing the model detergent packaged with the water-soluble film. The results are shown in Table 1.

Example 5

A water-soluble film was obtained in the same manner as that of Example 3, except that the draft ratio between the T-die and the support was changed to 3, the surface temperature of the support was changed to 105° C., the temperature of the hot air blown to the entire non-contact surface with the support was changed to 105° C., and the surface temperature of the heat treatment roll was changed to 180° C. Note that a reduction rate of volatile components in the film forming stock solution on the support under the above conditions was 6.7 mass %/sec. A contact angle, a swelling degree, a complete dissolution time, and a seal strength at 165° C. of the water-soluble film were measured using the obtained water-soluble film. Furthermore, a transportation test was conducted on a package containing the model detergent packaged with the water-soluble film. The results are shown in Table 1.

Example 6

A water-soluble film was obtained in the same manner as that of Example 1, except that the amount of glycerin as a polyhydric alcohol plasticizer was changed to 42 parts by mass with respect to 100 parts by mass of PVA. A reduction rate of volatile components in the film forming stock solution on the support under the above conditions was 2.4 mass %/sec. A contact angle, a swelling degree, a complete dissolution time, and a seal strength at 165° C. of the water-soluble film were measured using the obtained water-soluble film. Furthermore, a transportation test was conducted on a package containing the model detergent packaged with the water-soluble film. The results are shown in Table 1.

Comparative Example 2

A water-soluble film was obtained in the same manner as that of Example 3, except that the draft ratio between the T-die and the support was changed to 1.2 and the draw ratio from the support to the winding was changed to 0.8. A contact angle, a swelling degree, a complete dissolution time, and a seal strength at 165° C. of the water-soluble film were measured using the obtained water-soluble film. Furthermore, a transportation test was conducted on a package containing the model detergent packaged with the water-soluble film. The results are shown in Table 1.

Comparative Example 3

A water-soluble film was obtained in the same manner as that of Example 3, except that the amount of glycerin as a polyhydric alcohol plasticizer was changed to 1 part by mass with respect to 100 parts by mass of PVA. A reduction rate of volatile components in the film forming stock solution on the support under the above conditions was 2.2 mass %/sec. A contact angle, a swelling degree, a complete dissolution time, and a seal strength at 165° C. of the water-soluble film were measured using the obtained water-soluble film. Furthermore, a transportation test was conducted on a package containing the model detergent packaged with the water-soluble film. The results are shown in Table 1.

Comparative Example 4

A water-soluble film was obtained in the same manner as that of Example 1, except that the surface temperature of the support was changed to 70° C., the temperature of the hot air blown to the entire non-contact surface with the support was changed to 80° C., and the surface temperature of the heat treatment roll was changed to 90° C. A reduction rate of volatile components in the film forming stock solution on the support under the above conditions was 0.4 mass %/sec. A contact angle, a swelling degree, a complete dissolution time, and a seal strength at 165° C. of the water-soluble film were measured using the obtained water-soluble film. Furthermore, a transportation test was conducted on a package containing the model detergent packaged with the water-soluble film. The results are shown in Table 1.

Comparative Example 5

A water-soluble film was obtained in the same manner as that of Example 1, except that the draft ratio between the T-die and the support was changed to 3, the surface temperature of the support was changed to 105° C., and the temperature of the hot air blown to the entire non-contact surface with the support was changed to 105° C. A reduction rate of volatile components in the film forming stock solution on the support under the above conditions was 7.2 mass %/sec. A contact angle, a swelling degree, a complete dissolution time, and a seal strength at 165° C. of the water-soluble film were measured using the obtained water-soluble film. Furthermore, a transportation test was conducted on a package containing the model detergent packaged with the water-soluble film. The results are shown in Table 1.

Reference Example 1

The water-soluble film obtained in Example 3 was heat-sealed without being immersed in the model detergent in the method for measuring a seal strength at 165° C., and the seal strength at 165° C. was measured. The results are shown in Table 1. In the case where the water-soluble film was not immersed in the model detergent, the seal strength at 165° C. was higher than that in Example 3 in which the water-soluble film was immersed in the model detergent.

TABLE 1

| | | | Example 1 | Example 2 | Example 3 | Example 4 | Example 5 | Example 6 | Comparative Example 1 | Comparative Example 2 | Comparative Example 3 | Comparative Example 4 | Comparative Example 5 | Reference Example 1 |
|---|---|---|---|---|---|---|---|---|---|---|---|---|---|---|
| Film forming stock solution | PVA | Polymerization degree | 1200 | 1200 | 1200 | 1200 | 1200 | 1200 | 1200 | 1200 | 1200 | 1200 | 1200 | 1200 |
| | | Saponification degree (mol %) | 96 | 99 | 88 | 88 | 88 | 96 | 99 | 88 | 88 | 96 | 96 | 88 |
| | Modification | Copolymerization | MMM[a] | AMPS[b] | — | — | — | MMM | — | — | — | MMM | MMM | — |
| | | Modification degree (mol %) | 4 | 2 | — | — | — | 4 | — | — | — | 4 | 4 | — |
| | Polyhydric alcohol plasticizer | Amount added (part(s) by mass/PVA) | 25 | 25 | 25 | 25 | 25 | 42 | 25 | 25 | 1 | 25 | 25 | 25 |

TABLE 1-continued

|  |  | Example 1 | Example 2 | Example 3 | Example 4 | Example 5 | Example 6 | Comparative Example 1 | Comparative Example 2 | Comparative Example 3 | Comparative Example 4 | Comparative Example 5 | Reference Example 1 |
|---|---|---|---|---|---|---|---|---|---|---|---|---|---|
| Film forming conditions | Draft ratio between T-die and support | 11 | 11 | 11 | 31 | 3 | 11 | 11 | 1.2 | 11 | 11 | 3 | 11 |
| | Support temperature (° C.) | 90 | 90 | 90 | 80 | 105 | 90 | 90 | 90 | 90 | 70 | 105 | 90 |
| | Hot air temperature (° C.) | 100 | 100 | 100 | 90 | 105 | 100 | 100 | 100 | 100 | 80 | 105 | 100 |
| | Heat treatment temperature (° C.) | 110 | 110 | 110 | 180 | 180 | 110 | 110 | 110 | 110 | 90 | 110 | 110 |
| | Reduction rate of volatile components in film forming stock solution (mass %/sec) | 2.3 | 2.3 | 2.3 | 5.9 | 6.7 | 2.4 | 2.3 | 2.3 | 2.2 | 0.4 | 7.2 | 2.3 |
| | Support winding draw ratio | 1.4 | 1.4 | 1.4 | 1.8 | 1.4 | 1.4 | 1.4 | 0.8 | 1.4 | 1.4 | 1.4 | 1.4 |
| | Film thickness (μm) | 40 | 40 | 40 | 40 | 40 | 40 | 40 | 40 | 40 | 40 | 40 | 40 |
| Film physical properties | Contact angle (°) | 30 | 27 | 22 | 21 | 23 | 33 | 18 | 19 | 19 | 17 | 37 | |
| | Swelling degree (%) | 36 | 37 | 48 | 37 | 42 | 44 | 27 | 52 | 51 | 25 | 55 | |
| | Complete dissolution time (sec) | 33 | 42 | 45 | 64 | 33 | 21 | >100 | 32 | 24 | 44 | 21 | |
| Evaluation results | Seal strength at 165° C. (N/15 mm) | 7 | 8 | 2.3 | 2.1 | 2.8 | 9 | 1.6 | 1.8 | 1.9 | 1.9 | 1.9 | 8.1 |
| | Number of broken packages after transportation test (number) | 0 | 0 | 5 | 7 | 2 | 0 | 22 | 19 | 10 | 23 | 15 | |

[a]MMM = monomethyl maleate
[b]AMPS = 2-acrylamido-2-methylpropyl sulfonic acid

The invention claimed is:

1. A water-soluble film comprising polyvinyl alcohol having a polymerization degree of 100 to 3,000 and a polyhydric alcohol plasticizer in an amount of 1 to 50 parts by mass with respect to 100 parts by mass of the polyvinyl alcohol,
wherein when the water-soluble film is immersed in a model detergent containing 8.6 mass % of monoethanolamine, 23.8 mass % of dodecylbenzenesulfonic acid, 9.5 mass % of propylene glycol, 23.8 mass % of a lauryl alcohol ethoxylate-7 ethylene oxide adduct, 19.1 mass % of oleic acid, 9.5 mass % of diethylene glycol, and 5.7 mass % of water in an environment of 23° C. and 50% RH for 24 hours, and then deionized water is added dropwise to a surface of the film, a contact angle at 6 seconds after the dropwise addition is 20° or more,
when the water-soluble film is immersed in the model detergent in an environment of 23° C. and 50% RH for 24 hours and then the water-soluble film is immersed in deionized water at 5° C., a complete dissolution time is within 100 seconds, and
a swelling degree of the water-soluble film when the water-soluble film is immersed in the model detergent in an environment of 23° C. and 50% RH for 1 hour is 30 to 50%.

2. The water-soluble film according to claim 1, wherein the polyvinyl alcohol is carboxylic acid modified or sulfonic acid modified polyvinyl alcohol, and is polyvinyl alcohol having a saponification degree of 85 mol % or more.

3. The water-soluble film according to claim 1, comprising the polyhydric alcohol plasticizer in an amount of 5 to 50 parts by mass with respect to 100 parts by mass of the polyvinyl alcohol, wherein the polyvinyl alcohol has a polymerization degree of 500 to 1,500 and a saponification degree of 80 mol % to 99.5 mol %.

4. The water-soluble film according to claim 3, wherein the polyhydric alcohol plasticizer is selected from ethylene glycol, glycerin, diglycerin, propylene glycol, diethylene glycol, triethylene glycol, tetraethylene glycol, trimethylolpropane, and sorbitol.

5. The water-soluble film according to claim 3, wherein the polyhydric alcohol plasticizer is glycerin.

6. The water-soluble film according to claim 3, wherein the polyvinyl alcohol is unmodified polyvinyl alcohol.

7. The water-soluble film according to claim 3, wherein the polyvinyl alcohol is sulfonic acid modified polyvinyl alcohol.

8. The water-soluble film according to claim 7, wherein the sulfonic acid modified polyvinyl alcohol is polyvinyl alcohol modified with 2-acrylamido-2-methylpropyl sulfonic acid.

9. The water-soluble film according to claim 3, wherein the polyvinyl alcohol is carboxylic acid modified polyvinyl alcohol.

10. The water-soluble film according to claim 9, wherein the carboxylic acid modified polyvinyl alcohol is polyvinyl alcohol modified with monomethyl maleate.

11. The water-soluble film according to claim 1, wherein when the water-soluble film is immersed in the model detergent in an environment of 23° C. and 50% RH for 24 hours, and then deionized water is added dropwise to the surface of the film, the contact angle at 6 seconds after the dropwise addition is 35° or less.

12. The water-soluble film according to claim 1, wherein a seal strength of the water-soluble film is 2.0 to 10.0 N/15 mm when the water-soluble film is heat-sealed at 165° C. after the water-soluble film is immersed in the model detergent in an environment of 23° C. and 50% RH for 24 hours.

13. The water-soluble film according to claim 1, wherein a thickness of the water-soluble film is 5 to 80 μm.

14. A package comprising the water-soluble film according to claim 1, wherein the package contains a chemical agent.

15. The package according to claim 14, wherein the chemical agent is a liquid form.

16. The package according to claim 14, wherein the chemical agent is an agricultural chemical, a detergent, or a disinfectant.

17. The package according to claim 14, wherein the chemical agent is a detergent.

18. A method for manufacturing the water-soluble film according to claim 1 by casting a film forming stock solution containing polyvinyl alcohol into a film shape onto a support from a die through a die lip and drying the film forming stock solution,
   wherein a draft ratio obtained by dividing a linear velocity of the support on which the film forming stock solution is cast by a linear velocity of the film forming stock solution at the die lip is 2 to 60, and
   a reduction rate of volatile components in the film forming stock solution on the support is 0.5 to 7 mass %/sec.

19. The method for manufacturing the water-soluble film according to claim 18, wherein a draw ratio obtained by dividing a winding speed of the film after drying by the linear velocity of the support on which the film forming stock solution is cast is 0.95 to 1.8.

20. The method for manufacturing the water-soluble film according to claim 18, wherein the method includes a step of heat-treating the water-soluble film at 80 to 300° C.

* * * * *